Figure 1:
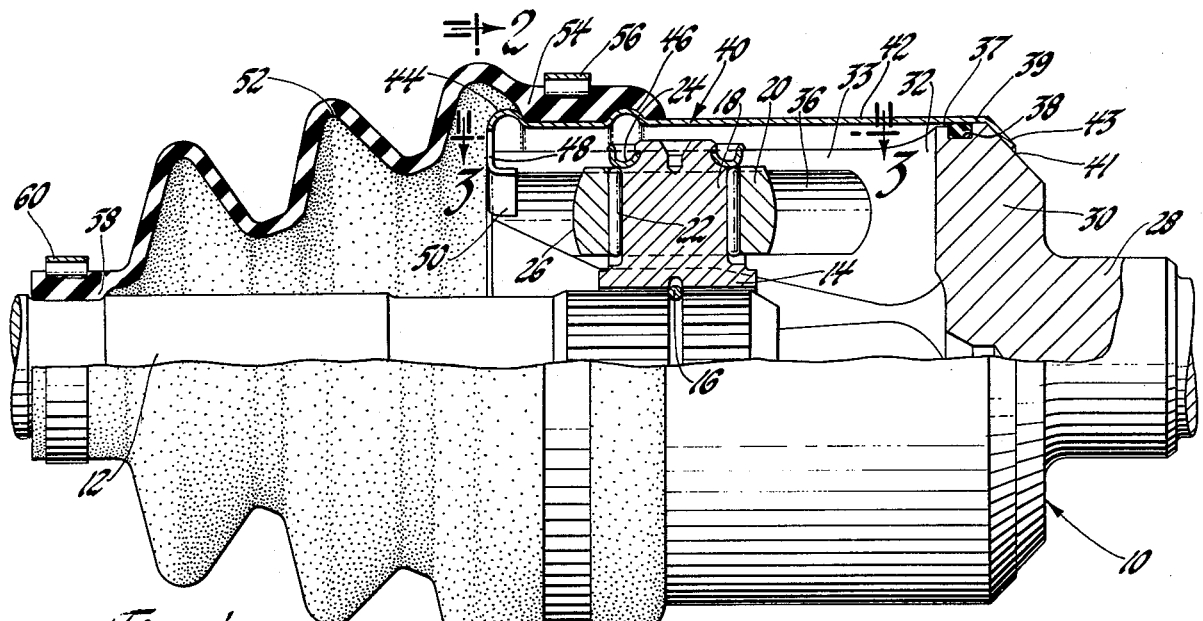

United States Patent [19]

Westercamp

[11] 4,083,202
[45] Apr. 11, 1978

[54] STROKING UNIVERSAL JOINT HOUSING

[75] Inventor: Kenneth L. Westercamp, Saginaw, Mich.

[73] Assignee: General Motors Corporation, Detroit, Mich.

[21] Appl. No.: 711,852

[22] Filed: Aug. 5, 1976

[51] Int. Cl.² .......................... F16D 3/30; F16D 3/02
[52] U.S. Cl. ................................. 64/32 R; 64/32 F; 64/21; 64/7; 64/8
[58] Field of Search .................... 64/32 R, 32 F, 21, 8

[56] References Cited
U.S. PATENT DOCUMENTS

| | | | |
|---|---|---|---|
| 2,299,351 | 7/1941 | Schoenrock | 64/7 |
| 2,361,135 | 10/1941 | Sturges | 64/21 |
| 3,596,478 | 8/1971 | Komuzin | 64/21 |
| 3,613,396 | 10/1971 | Drevard et al. | 64/21 |
| 3,643,468 | 2/1972 | Kleinschmidt | 64/8 |
| 3,745,789 | 7/1973 | Orain | 64/21 |
| 3,747,369 | 7/1973 | Morin | 64/21 |
| 3,757,534 | 9/1973 | Orain | 64/21 |

Primary Examiner—Benjamin W. Wyche
Assistant Examiner—R. C. Turner
Attorney, Agent, or Firm—F. J. Fodale

[57] ABSTRACT

A stroking universal joint has a sheet metal housing for enclosing the open portions of a "tulip shaped" outer drive member and serving as a mount for a flexible boot seal. The sheet metal housing comprises a sleeve having at one end a plurality of radial tabs each having a pair of perpendicular ears. The ears are positioned to retain intermediate drive rollers on an inner drive spider in the longitudinal drive channels of the "tulip shaped" outer drive member. The pairs of perpendicular ears also limit relative rotation between the housing and the "tulip shpaed" outer drive member.

3 Claims, 4 Drawing Figures

STROKING UNIVERSAL JOINT HOUSING

This invention relates generally to stroking universal joints and more particularly to stroking universal joints having a "tulip shaped" outer drive member.

A stroking universal joint having a "tulip shaped" outer drive member is exemplified by the stroking constant velocity three roller universal joint disclosed in the U.S. Pat. No. 3,613,396 granted to Michel Drevard et al on Oct. 19, 1971. As can be seen from the Drevard et al patent a "tulip shaped" outer drive member comprises a flange having a number of axially extending fingers which form a like number of radially open longitudinal drive channels which receive intermediate drive rollers carried by a spider shaped inner drive member. Such universal joints may be sealed by means comprising a sheet metal housing enclosing the open channel portions of the "tulip shaped" outer drive member between the axial fingers. A flexible rubber boot seal attached to the sheet metal housing and the shaft of the inner drive member completes the sealing arrangement.

The object of my invention is to provide an improved sheet metal housing for enclosing the open channel portions of the "tulip shaped" outer drive member which also serves to retain the intermediate drive rollers in the longitudinal drive channels.

Another object of my invention is to provide an improved housing as noted above which consists of a simple one piece stamping which is thus very economical to manufacture.

A feature of my invention is that the portions of the housing which retain the intermediate drive rollers in the longitudinal drive channels also limits relative rotation between the housing and the outer drive member to prevent the flexible seal boot wrapping up.

Another feature of my invention is that the portions of the housing which retain the intermediate drive rollers are disposed to wedge between the intermediate drive rollers and the longitudinal drive channels and thus strongly resist the inner and outer drive members being pulled apart during handling.

Another feature of my invention is that the sheet metal housing provides a rigorously unitized universal joint assembly which makes it easier and more economical to properly assemble the joints in cars, to disassemble the joints from the cars, and to ship replacement joints for service in the field.

Figure 2:
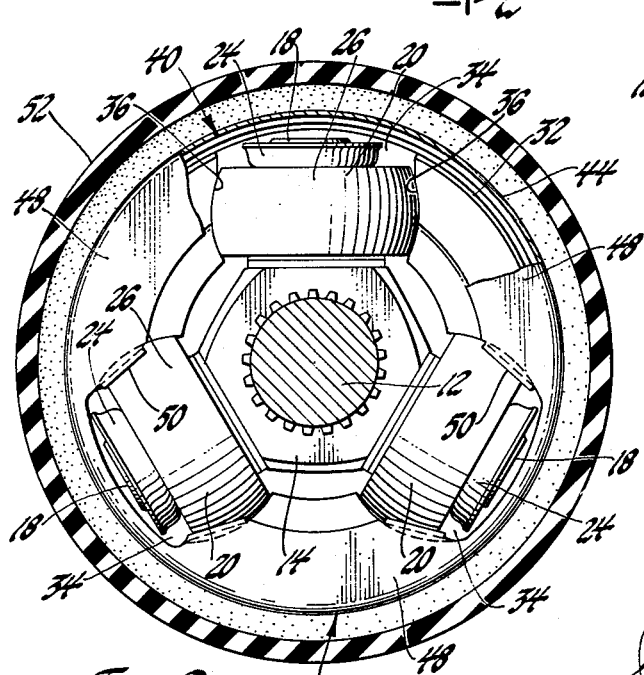
Figure 3:
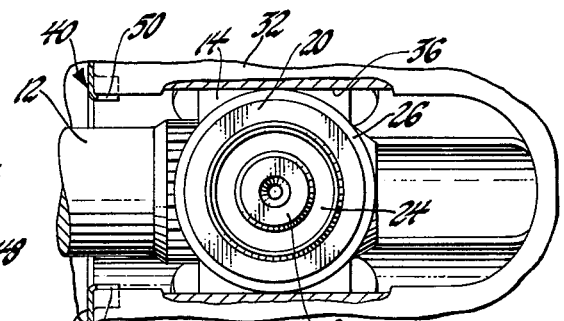
Figure 4:
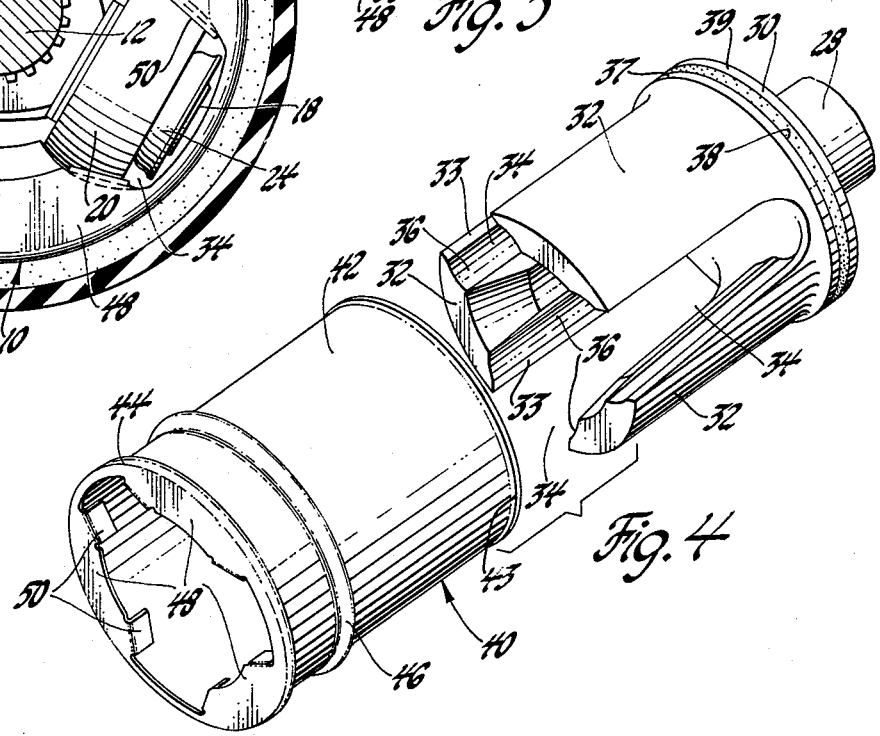

The exact nature of this invention as well as other objects and advantages thereof will be readily apparent from consideration of the following specification relating to the annexed drawing in which:

FIG. 1 is an elevational view partially sectioned of a stroking universal joint having an improved sheet metal housing in accordance with my invention, FIG. 2 is a section taken substantially along the line 2—2 of FIG. 1 looking in the direction of the arrows, FIG. 3 is a section taken substantially along the line 3—3 of FIG. 1 looking in the direction of the arrows, FIG. 4 is an exploded perspective view of the "tulip shaped" outer drive member and improved sheet metal housing shown in FIG. 1.

Referring now to the drawing, there is disclosed a stroking universal joint 10 having an inner drive member comprising a drive shaft 12 and a drive spider 14. The drive spider 14 is secured to the end of the drive shaft 12 by cooperating splines and a snap ring 16 disposed in cooperating grooves in the splined end of the drive shaft 12 and the splined bore of the drive spider 14 respectively. The drive spider 14 has three equally circumferentially spaced radial trunnions 18 radiating from its central hub.

Three intermediate drive members or rollers 20 are respectively mounted on the three trunnions 18 with full complements of needle rollers 22 interposed between the bores of the drive rollers 20 and the trunnions 18. The intermediate drive rollers 20 thus are both rotatable on the trunnions 18 and slidable with respect thereto in the radial direction. An annular sheet metal retainer 24 secured to the outer end of each trunnion 18 retains the needle rollers 22 and limits the radial outward movement of the associated drive roller 20 with respect to its trunnion 18. Each of the three intermediate drive rollers 20 has a substantially part spherical drive surface 26 having a center substantially concentric with the radial axis of its associated trunnion 18.

The universal joint 10 further comprises an outer drive member 28 having a flange 30 normal to its longitudinal axis. The flange 30 has three axially extending fingers 32 each having two radial faces 33 arranged in three pairs of confronting radial faces forming three, equally circumferentially spaced, radially open, longitudinal drive channels 34. Each of the radial faces 33 has a part cylindrical groove 36 which matingly engages an intermediate drive roller 20 disposed in its associated drive channel 34 in an equator spanning relationship at all operating angles of the joint. Consequently each of the drive rollers 20 are captured in the radial direction in their associated drive channel 34 and maintained substantially equidistant from the longitudinal axis of the outer drive member 28 during joint operation. As is well known with such three roller drives, the center of the drive spider 14 is offset with respect to the axis of the outer drive member 28 and orbits at three times shaft speed when the joint is bent at an angle and rotated. During such orbiting, the drive rollers 20 slide radially on the needles 22.

As best seen in FIG. 4, the fingers 32 are arcuate in cross section and have outer part cylindrical surfaces of a common diameter which is preferably slightly less than the diameter of the cylindrical land 37 of the flange 30 between the fingers 32 and an annular groove 38. Similarly the land 39 behind the groove 38 preferably has a slightly greater diameter than the land 37, as will hereinafter more fully appear.

The sheet metal housing 40 for enclosing the open channel portions of the outer drive member 28 comprises a cylindrical sleeve 42 having a plain end 43 which is preferably initially slightly bell-mouthed to facilitate assembly. At the opposite end the sleeve 42 has a circumferential bead 44 and a second circumferential bead 46 spaced a short distance therefrom which strengthen the sleeve 42 and provide a means for mounting a rubber boot seal 52 as will hereinafter more fully appear.

The housing 40 further comprises three radial tabs 48 which extend radially inwardly from the bead 44 at the end of the sleeve 42. The radial tabs 48 are arcuate in plan view and extend circumferentially a distance substantially equal to the width of the fingers 32 in the circumferential direction.

Each of the radial tabs 48 has a perpendicular flat ear 50 at each circumferential end which is bent back toward the plain end 43 of the sleeve 42.

The housing 40 may be economically formed from sheet metal stock by conventional drawing, stamping and bending techniques well known to those skilled in the art. Suffice it to say that a sheet metal cup is drawn from flat stock in a number of operations which includes forming the expanded beads 44 and 46 and a bottom wall. The bottom wall is simply stamped out to provide the radial tabs 48 and adjoining portions which are then bent upright to form the ears 50.

The housing 40 is assembled to the outer drive member 28 by inserting the finger end of the outer drive member 28 into the preferably slightly bell-mouthed, plain end 43 of the housing 40 until the end faces of the fingers 32 abut the inside faces of the radial tabs 48. The plain end 43 of the housing 40 is then spun over the frustoconical surface 41 of the flange 30.

During assembly the sleeve 42 first embraces the outer surface of the fingers 32 with a slip fit and then pilots on the cylindrical land 37 with a slightly tighter slip fit because of its preferably slightly greater diameter. Thereafter sleeve 42 compresses an "O" ring disposed in the groove 38 and is preferably press fitted on the land 39 for a secure sealed connection. In the assembled position, the ears 50 are juxtaposed the part cylindrical groove 36 of the radial faces 33 at the free longitudinal end portions of the fingers 32. As best seen in FIG. 3, the flat ears 50 are disposed in a position to wedge between the drive rollers 20 and the radial faces 33 responsive to attempted withdrawal of the drive rollers 30 and inner drive spider 14 from the outer drive member 28. The wedging action may result in the flat sheet metal ears being permanently deformed into the part cylindrical grooves 36 without damage to the harder drive rollers 20 and outer drive member 28. Due to the wedging action, the universal joint assembly is much more rigorously unitized than if the spun over portion at the plain end 43 of the sleeve 42 had to resist all of the forces pulling the inner and outer drive members apart in the longitudinal direction. The pair of ears 50 on each of the radial tabs 48 also entrap an end of one of the fingers 32 between them. In the event that the secure connection at the flange 30 is loosened during operation, the tabs thus limit the relative rotation between the housing 40 and the member 28 up to a few degrees depending on the manufacturing tolerances on the housing 40. The ears 50 thus perform the dual function of limiting relative circumferential movement between the sheet metal housing 40 and the outer drive member 28 and retaining the intermediate drive rollers 20 in the longitudinal drive channels 34.

After the sheet metal housing 40 is assembled, the universal joint may then be completely sealed by a conventional bellows shaped rubber boot 52, having a large diameter mounting rim 54 at one end adapted for mounting on the beaded end of the sheet metal housing 40. More specifically, the rim 54 has an internal groove which receives the circumferential bead 46 while the portion of the rim 54 between the circumferential beads 44 and 46 is secured in position by a metal band 56. The small diameter mounting rim 58 at the other end of the boot seal 52 is secured in a shallow circumferential groove in the drive shaft 12 by a metal band 60.

I wish it to be understood that I do not desire to be limited to the exact details of construction shown and described, for obvious modifications will occur to a person skilled in the art.

What is claimed is:

1. In a stroking universal joint having an inner drive member having a plurality of circumferentially spaced radial trunnions, an outer drive member having a flange normal to its longitudinal axis and a plurality of fingers extending axially from said flange, said fingers having longitudinal radial faces forming a plurality of circumferentially spaced, radially open, longitudinal drive channels and an intermediate drive roller rotatably mounted on each of said trunnions of said inner drive member and disposed in one of said longitudinal drive channels of said outer drive member, the improvement comprising:
    a unitary sheet metal housing for enclosing said longitudinal drive channels and retaining said intermediate drive rollers therein,
    said housing comprising a sleeve embracing said fingers and having one end tightly engaging an outer periphery of said flange,
    a plurality of integral radial tabs entending inwardly at the opposite end of said sleeve and juxtaposed respective radial end faces of said fingers,
    each of said radial tabs having an integral perpendicular ear juxtaposed a longitudinal radial face of one of said fingers for wedging engagement between it and one of said intermediate drive rollers, and
    each of said longitudinal drive channels having one of said ears disposed therein to retain one of said intermediate drive rollers in said drive channels.

2. In a stroking universal joint having an inner drive member having a plurality of circumferentially spaced radial trunnions, an outer drive member having a flange normal to its longitudinal axis and a plurality of fingers extending axially from said flange, said fingers having longitudinal radial faces forming a plurality of circumferentially spaced, radially open, longitudinal drive channels and an intermediate drive roller rotatably mounted on each of said trunnions of said inner drive member and disposed in one of said longitudinal drive channels of said outer drive member, the improvement comprising:
    a unitary sheet metal housing for enclosing said longitudinal drive channels and retaining said intermediate drive rollers therein,
    said housing comprising a sleeve embracing said fingers and having one end tightly engaging an outer periphery of said flange,
    a plurality of integral radial tabs extending inwardly at the opposite end of said sleeve and abutting respective radial end faces of said fingers,
    each of said radial tabs having an integral perpendicular ear and at least one of said radial tabs having an integral perpendicular ear at each circumferential end forming a pair of ears which is juxtaposed opposite longitudinal radial faces of one of said fingers to limit rotational movement of said housing with respect to said outer drive member, and
    each of said longitudinal drive channels having at least one of said ears disposed therein for wedging engagement between a longitudinal radial face of one of said fingers and an intermediate drive roller disposed therein to maintain said intermediate drive rollers in said drive channels.

3. In a stroking universal joint having an inner drive member having a plurality of circumferentially spaced radial trunnions, an outer drive member having a flange normal to its longitudinal axis and a plurality of fingers extending axially from said flange, said fingers having longitudinal radial faces forming a plurality of circumferentially spaced, radially open, longitudinal drive channels and an intermediate drive roller rotatably mounted on each of said trunnions of said inner drive member and disposed in one of said longitudinal drive channels of said outer drive member, the improvement comprising:

a unitary sheet metal housing for enclosing said longitudinal drive channels and retaining said intermediate drive rollers therein, said housing comprising a sleeve embracing said fingers and having one end tightly engaging an outer periphery of said flange, a plurality of integral radial tabs extending inwardly at the opposite end of said sleeve and juxtaposed respective radial end faces of said fingers, each of said radial tabs having an integral perpendicular ear at each circumferential end forming pairs of ears which are juxtaposed opposite longitudinal radial faces of one of said fingers respectively to limit rotational movement of said housing with respect to said outer drive member and to retain said intermediate drive rollers in said drive channels, and said sleeve having a pair of longitudinally spaced outwardly raised circumferential beads adjacent said opposite end for forming an outer circumferential groove for receiving a mounting rim of a boot seal.

* * * * *